US009285865B2

(12) United States Patent
Keish et al.

(10) Patent No.: US 9,285,865 B2
(45) Date of Patent: Mar. 15, 2016

(54) DYNAMIC LINK SCALING BASED ON BANDWIDTH UTILIZATION

(75) Inventors: Brian F. Keish, San Jose, CA (US); Thomas M. Wicki, Palo Alto, CA (US); Sebastian Turullols, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 374 days.

(21) Appl. No.: 13/539,294

(22) Filed: Jun. 29, 2012

(65) Prior Publication Data

US 2014/0006831 A1  Jan. 2, 2014

(51) Int. Cl.
*G06F 1/00* (2006.01)
*G06F 1/32* (2006.01)
*G06F 13/38* (2006.01)
*H04N 21/231* (2011.01)

(52) U.S. Cl.
CPC .............. *G06F 1/3243* (2013.01); *G06F 1/32* (2013.01); *G06F 13/38* (2013.01); *G06F 1/3203* (2013.01); *G06F 1/3209* (2013.01); *G06F 1/3253* (2013.01); *G06F 1/3287* (2013.01); *H04N 21/23106* (2013.01); *Y02B 60/1239* (2013.01)

(58) Field of Classification Search
CPC ... G06F 1/3203; G06F 1/3287; G06F 1/3253; G06F 1/3209; G06F 1/3278; G06F 13/38; G06F 1/32; H04N 1/23106
See application file for complete search history.

(56) References Cited

U.S. PATENT DOCUMENTS 4,556,972 A * 12/1985 Chan et al. .................... 370/354
4,630,260 A    12/1986 Toy et al.
4,945,467 A *  7/1990 Bhagwat ....................... 363/132
5,079,666 A *  1/1992 Najm ............................. 361/85
5,083,265 A *  1/1992 Valiant ............................ 712/21
5,293,377 A *  3/1994 Gould .......................... 370/410
5,331,619 A *  7/1994 Barnum et al. ................. 700/3
5,581,556 A * 12/1996 Ohie ............................. 370/431

(Continued)

FOREIGN PATENT DOCUMENTS

| GB | 2416056 | 1/2006 |
|---|---|---|
| WO | 2004109528 | 12/2004 |
| WO | 2005066965 | 7/2005 |

OTHER PUBLICATIONS

Fully Buffered DIMM (FB-DIMM) Server Memory Architecture: Capacity, Performance, Reliability and Longevity—Feb. 18, 2004— Retrieved from http://www.idt.com/content/OSA—FB-DIMM-arch.pdf VOGT—Note connections of FB-DIMM's on p. 9.

(Continued)

*Primary Examiner* — Thomas Lee
*Assistant Examiner* — Zhipeng Wang
(74) *Attorney, Agent, or Firm* — Rory D. Rankin; Meyertons, Hood, Kivlin, Kowert & Goetzel, P.C.

(57) ABSTRACT

Systems and methods for reducing power consumption during data transport across multiple processors when link utilization is low. In a multi-node system, at least one of two nodes may indicate low utilization for a given link between them. In response to further determining no enabled link between the two nodes is over utilized, each of the two nodes may remove the given link from consideration for being scheduled to receive data for transfer and turn off the given link when no more transactions are scheduled for the given link. Disabled links may be re-enabled when high utilization is detected on at least one link between the two nodes.

19 Claims, 5 Drawing Sheets

(56) References Cited

U.S. PATENT DOCUMENTS

| | | | |
|---|---|---|---|
| 5,590,126 A * | 12/1996 | Mishra et al. | 370/329 |
| 5,742,495 A * | 4/1998 | Barone | 363/65 |
| 5,907,675 A * | 5/1999 | Aahlad | 709/203 |
| 6,115,580 A | 9/2000 | Chuprun et al. | |
| 6,295,586 B1 | 9/2001 | Novak et al. | |
| 6,338,113 B1 | 1/2002 | Kubo et al. | |
| 6,502,161 B1 | 12/2002 | Perego et al. | |
| 6,571,325 B1 | 5/2003 | Satagopan et al. | |
| 6,725,314 B1 | 4/2004 | Dong | |
| 6,862,618 B1 | 3/2005 | Gray et al. | |
| 6,882,082 B2 | 4/2005 | Greeff et al. | |
| 6,922,770 B2 | 7/2005 | Shanmugasundaram et al. | |
| 6,941,428 B2 | 9/2005 | Carr | |
| 6,975,637 B1 * | 12/2005 | Lenell | 370/412 |
| 6,999,421 B1 | 2/2006 | Holzworth et al. | |
| 7,017,022 B2 | 3/2006 | Jeddeloh | |
| 7,032,092 B2 | 4/2006 | Lai | |
| 7,051,151 B2 | 5/2006 | Perego et al. | |
| 7,149,841 B2 | 12/2006 | LaBerge | |
| 7,224,638 B1 | 5/2007 | Risk et al. | |
| 7,350,048 B1 | 3/2008 | Schulz | |
| 7,496,777 B2 | 2/2009 | Kapil | |
| 7,523,282 B1 | 4/2009 | Kapil et al. | |
| 7,529,894 B2 | 5/2009 | Hetherington et al. | |
| 7,533,212 B1 | 5/2009 | Doblar et al. | |
| 7,533,218 B2 | 5/2009 | Cypher | |
| 7,715,312 B2 * | 5/2010 | Khasnabish et al. | 370/230 |
| 7,721,011 B1 | 5/2010 | Sutera | |
| 7,738,457 B2 * | 6/2010 | Nordmark et al. | 370/392 |
| 7,792,140 B2 | 9/2010 | Droux et al. | |
| 7,869,439 B1 | 1/2011 | Ramberg et al. | |
| 7,872,965 B2 | 1/2011 | Enstone et al. | |
| 7,889,652 B1 | 2/2011 | Minei et al. | |
| 7,912,082 B2 | 3/2011 | Yang et al. | |
| 8,031,731 B2 | 10/2011 | Yu et al. | |
| 8,180,557 B2 | 5/2012 | Yamane et al. | |
| 8,588,254 B2 * | 11/2013 | Diab et al. | 370/477 |
| 2002/0120745 A1 | 8/2002 | Oishi et al. | |
| 2003/0076781 A1 | 4/2003 | Enomoto et al. | |
| 2003/0130832 A1 | 7/2003 | Schulter et al. | |
| 2004/0030794 A1 | 2/2004 | Hugly et al. | |
| 2004/0066217 A1 * | 4/2004 | Daniels et al. | 327/99 |
| 2004/0071083 A1 * | 4/2004 | Li et al. | 370/230 |
| 2004/0183795 A1 | 9/2004 | Deering et al. | |
| 2004/0267960 A1 | 12/2004 | Riedle | |
| 2005/0053060 A1 | 3/2005 | Pettey | |
| 2005/0120185 A1 * | 6/2005 | Yamazaki et al. | 711/147 |
| 2005/0198458 A1 | 9/2005 | Cho | |
| 2005/0232157 A1 | 10/2005 | Tyan et al. | |
| 2005/0262284 A1 * | 11/2005 | Cherukuri et al. | 710/307 |
| 2005/0288031 A1 * | 12/2005 | Davis et al. | 455/452.1 |
| 2006/0020740 A1 | 1/2006 | Bartley et al. | |
| 2006/0024541 A1 | 2/2006 | Weiss et al. | |
| 2006/0034295 A1 * | 2/2006 | Cherukuri et al. | 370/395.52 |
| 2006/0077995 A1 * | 4/2006 | Lenell | 370/412 |
| 2006/0087963 A1 * | 4/2006 | Jain et al. | 370/217 |
| 2006/0225074 A1 | 10/2006 | Vaid et al. | 718/102 |
| 2006/0239271 A1 * | 10/2006 | Khasnabish et al. | 370/395.21 |
| 2007/0067462 A1 | 3/2007 | Takeda | |
| 2007/0111718 A1 | 5/2007 | Palum et al. | 455/418 |
| 2007/0153695 A1 * | 7/2007 | Gholmieh et al. | 370/235 |
| 2007/0206547 A1 | 9/2007 | Gong et al. | |
| 2008/0002585 A1 * | 1/2008 | Safranek et al. | 370/235 |
| 2008/0072098 A1 * | 3/2008 | Hunsaker et al. | 713/501 |
| 2008/0240142 A1 | 10/2008 | Belgaied et al. | |
| 2009/0015976 A1 * | 1/2009 | Hara et al. | 361/64 |
| 2009/0070025 A1 | 3/2009 | Kumagai et al. | |
| 2009/0198957 A1 | 8/2009 | Arimilli et al. | |
| 2009/0204827 A1 * | 8/2009 | Diab et al. | 713/320 |
| 2009/0204828 A1 * | 8/2009 | Diab et al. | 713/320 |
| 2009/0296693 A1 * | 12/2009 | Ebisawa | 370/352 |
| 2010/0091656 A1 | 4/2010 | Chiu et al. | |
| 2010/0316065 A1 * | 12/2010 | Kapil et al. | 370/465 |
| 2011/0035494 A1 | 2/2011 | Pandey et al. | |
| 2011/0134795 A1 * | 6/2011 | Sutterfield et al. | 370/254 |
| 2011/0200056 A1 * | 8/2011 | Diab et al. | 370/463 |
| 2011/0249687 A1 * | 10/2011 | Diab et al. | 370/474 |
| 2011/0264938 A1 * | 10/2011 | Henroid et al. | 713/323 |
| 2012/0009883 A1 * | 1/2012 | Shan et al. | 455/67.11 |
| 2012/0011276 A1 * | 1/2012 | Cherukuri et al. | 709/238 |
| 2012/0079590 A1 | 3/2012 | Sastry et al. | |
| 2012/0155258 A1 | 6/2012 | De Vleeschauwer et al. | |
| 2012/0155262 A1 | 6/2012 | Li et al. | |
| 2012/0254881 A1 * | 10/2012 | Hamamoto et al. | 718/102 |
| 2012/0304180 A1 | 11/2012 | Imade | |
| 2013/0007491 A1 * | 1/2013 | Iyer et al. | 713/321 |
| 2013/0031253 A1 * | 1/2013 | Hui et al. | 709/225 |
| 2013/0054996 A1 * | 2/2013 | Diab et al. | 713/323 |
| 2013/0128735 A1 | 5/2013 | Li et al. | |
| 2013/0346645 A1 | 12/2013 | Mayhew | |
| 2013/0346772 A1 * | 12/2013 | Abou Gazala et al. | 713/320 |
| 2014/0006673 A1 * | 1/2014 | Varma et al. | 710/307 |
| 2014/0040526 A1 | 2/2014 | Chang et al. | |
| 2014/0149775 A1 * | 5/2014 | Ware | 713/323 |

OTHER PUBLICATIONS

Non-Final Office Action in U.S. Appl. No. 13/563,586, mailed Aug. 13, 2014, 9 pages.
Final Office Action in U.S. Appl. No. 13/563,586, mailed Feb. 27, 2015, 10 pages.
Non-Final Office Action in U.S. Appl. No. 13/563,586, mailed Sep. 8, 2015, 14 pages.
Final Office Action in U.S. Appl. No. 13/563,586, mailed Jan. 12, 2016, 20 pages.

* cited by examiner

DYNAMIC LINK SCALING BASED ON BANDWIDTH UTILIZATION

BACKGROUND OF THE INVENTION

1. Field of the Invention

This invention relates to high performance computing network systems, and more particularly, to reducing power consumption during data transport across multiple processors when link utilization is low.

2. Description of the Relevant Art

The performance of computing systems is dependent on both hardware and software. In order to increase the throughput of computing systems, the parallelization of tasks is utilized as much as possible. To this end, compilers may extract parallelized tasks from program code and many modern processor core designs have deep pipelines configured to perform chip multi-threading (CMT). In hardware-level multi-threading, a simultaneous multi-threaded processor core executes hardware instructions from different software processes at the same time. In contrast, single-threaded processors operate on a single thread at a time.

In order to utilize the benefits of CMT on larger workloads, the computing system may be expanded from a single-socket system to a multi-socket system. For example, scientific computing clusters utilize multiple sockets. Each one of the multiple sockets includes a processor with one or more cores. The multiple sockets may be located on a single motherboard, which is also referred to as a printed circuit board. Alternatively, the multiple sockets may be located on multiple motherboards connected through a backplane in a server box, a desktop, a laptop, or other chassis.

In a symmetric multi-processing system, each of the processors shares one common store of memory. In contrast, each processor in a multi-socket computing system includes its own dedicated store of memory. In a multi-socket computing system, each processor is capable of accessing a memory store corresponding to another processor, transparent to the software programmer. A dedicated cache coherence link may be used between two processors within the multi-socket system for accessing data stored in caches or a dynamic random access memory (DRAM) of another processor. Systems with CMT use an appreciable amount of memory bandwidth. The dedicated cache coherence links in a multi-socket system provide near-linear scaling of performance with thread count.

The power consumption of modern integrated circuits (IC's) has become an increasing design issue with each generation of semiconductor chips. As power consumption increases, more costly cooling systems are utilized to remove excess heat and prevent IC failure. The IC power dissipation constraint is not only an issue for portable computers and mobile communication devices, but also for high-performance stationary computing systems. In order to manage power consumption, a chip-level power management system typically disables portions of the chip when experiencing no utilization for a given time period. Sleep modes and clock disabling are used in these portions. However, the multiple similar logic structures are not disabled if some of the structures experience utilization, even low utilization.

In view of the above, methods and mechanisms for reducing power consumption during data transport across multiple processors when utilization is low are desired.

SUMMARY OF THE INVENTION

Systems and methods for reducing power consumption during data transport across multiple processors when utilization is low are contemplated. In one embodiment, a computing system includes multiple processors, each located in a respective socket on a printed circuit board. Each processor includes one or more processor cores and one or more on-die caches arranged in a cache hierarchical subsystem. A processor within a socket is connected to a respective off-die memory, such as at least dynamic random access memory (DRAM). A processor within a socket and its respective off-die memory may be referred to as a node. A processor within a given node may have access to a most recently updated copy of data in the on-die caches and off-die memory of other nodes through one or more coherence links.

The links may be bidirectional links or unidirectional links. As used herein, when bidirectional links are used between the two nodes, a set of links, or a set, refers to a group of links between two nodes. When unidirectional links are used between the two nodes, a set of links, or a set, refers to a group of links between two nodes with a same direction of data transfer. Therefore, when bidirectional links are used, there is one set of links between the two nodes. When unidirectional links are used, there are two sets of links between the two nodes, each set corresponding to a given direction of data transfer. A first set may include the unidirectional links with an incoming data transfer direction with respect to a given node of the two nodes. A second set may include the unidirectional links with an outgoing data transfer direction with respect to the given node of the two nodes. If a mixture of bidirectional and unidirectional links are used between the two nodes, then there are two sets of links with an overlap, which includes the bidirectional links.

The hardware including the multiple nodes may be controlled by software. The software includes power management logic and a hypervisor. For a given link in a set of links between two nodes in the system, at least one of the two nodes may send an indication of low utilization for a given direction within the given link between them to control logic in the software. The indication may be a generated trap. Each trap may be generated in response to determining the given link is underutilized. For example, a bidirectional link has two directions. One or both directions within a given bidirectional link may be underutilized.

A thread, such as a trap handler, may be executed in response to the generated trap. When the trap handler executes, control logic within the software may send a notification for turning off the given link to each of the two nodes. The control logic may send this notification in response to receiving the indication of low utilization for the given link from at least one of the two nodes and determining no one of the enabled links in a set between the two nodes is over utilized. In response to receiving from the control logic the corresponding notification of disabling the given link, each of the two nodes may remove the given link from consideration for being scheduled to receive data for transfer. Additionally, each of the two nodes may turn off the given link, in response to detecting no more transactions are scheduled for the given link.

For another given link between any two nodes in the system, either of the two nodes may send an indication of high utilization for the given link between them to control logic in the software. The indication may be a generated trap. The trap may be generated in response to determining the given link is over utilized.

When a corresponding trap handler executes, control logic within the software may send a notification for turning on another link in the set of links between the two nodes to each of the two nodes. The other link may be a currently disabled link in the set. The other link may be able to handle the packet types that are currently causing the high utilization. The control logic may send the notification for turning on the other link in response to receiving the indication of high utilization for the given link in the set from at least one of the two nodes and determining the other link is disabled and handles packet types causing the high utilization. In response to receiving from the control logic the corresponding notification of enabling the other link, each of the two nodes may turn on the other link and add this other link for consideration for being scheduled to receive data for transfer, in response to further determining this other link has completed startup training.

These and other embodiments will become apparent upon reference to the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

A socket is an electrical and mechanical component on a printed circuit board. The socket may also be referred to as a central processing unit (CPU) socket. Without soldering, the socket connects the processor to other chips and buses on the printed circuit board. Sockets are typically used in desktop and server computers. In contrast, portable computing devices, such as laptops, use surface mount processors. Surface mount processors consume less space on a printed circuit board than a socket, but also need soldering.

Whether socket or surface mount technology is used, a computing system may include multiple processors located on one or more printed circuit boards. Each processor of the multiple processors is connected to a respective off-die memory. The respective off-die memory may include at least a dynamic random access memory (DRAM). Through the use of coherence links, each processor is connected to one or more other processors in the system, and has access to on-die caches and a respective off-die memory of the one or more other processors. Whether socket or surface mount technology is used, a processor and its respective off-die memory may be referred to as a node. A processor within a given node may have access to a most recently updated copy of data in the on-die caches and off-die memory of other nodes through one or more coherence links.

The processor within a node may include one or more general-purpose processor cores and one or more on-die caches arranged in a cache hierarchical subsystem. The general-purpose processor cores may execute instructions according to a given general-purpose instruction set. Alternatively, a processor within a node may include heterogeneous cores, such as one or more general-purpose cores and one or more application specific cores. The application specific cores may include a graphics processing unit (GPU), a digital signal processor (DSP), and so forth.

Whether a processor is connected on a printed circuit board with socket or surface mount technology, the processor may be connected to a respective off-die memory. The off-die memory may include dynamic random access memory (DRAM), a Buffer on Board (BoB) interface chip between the processor and DRAM, and so forth. The off-die memory may be connected to a respective memory controller for the processor. The DRAM may include one or more dual in-line memory module (DIMM) slots. The DRAM may be further connected to lower levels of a memory hierarchy, such as a disk memory and offline archive memory.

Figure 1:
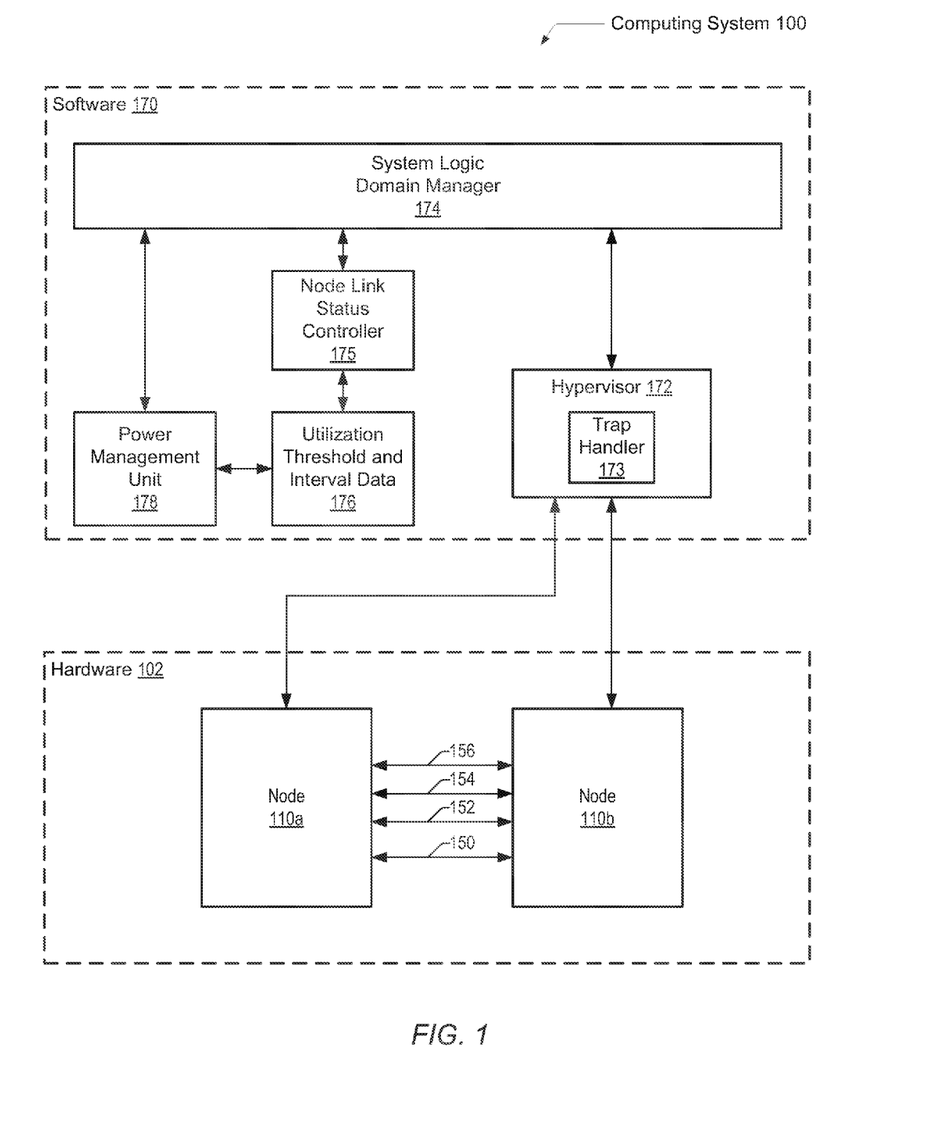
FIG. 1 is a generalized block diagram illustrating one embodiment of a computing system.

Referring to FIG. 1, a generalized block diagram illustrating one embodiment of a computing system 100 is shown. Computing system 100 includes hardware 102 and software 170. The hardware 102 includes nodes 110a-110b. Although two nodes are shown in FIG. 1, other embodiments may comprise a different number of nodes. As described above, each one of the nodes 110a-110b may include a processor and its respective off-die memory. The processor may be connected to a printed circuit board with socket or surface mount technology. Through the use of coherence links 150-156, each processor within the nodes 110a-110b is connected to another one of the processors in the computing system 100 and has access to on-die caches and a respective off-die memory of the other one of the processors.

Memory controllers within the nodes 110a-110b may include control circuitry for interfacing to memories. Additionally, the memory controllers may include request queues for queuing memory requests. In one embodiment, the coherency points for addresses within the computing system 100 are the memory controllers within the nodes 110a-110b connected to the memory storing bytes corresponding to the addresses. In other embodiments, the cache coherency scheme may be directory based, and the coherency point is the respective directory within each of the nodes 110a-110b. The memory controllers may include or be connected to coherence units. In a directory-based cache coherence scheme, the coherence units may store a respective directory. These coherence units are further described later. Additionally, the nodes 110a-110b may communicate with input/output (I/O) devices, which may include computer peripheral devices. Alternatively, each one of the nodes 110a-110b may communicate with an I/O bridge, which is coupled to an I/O bus.

As shown in FIG. 1, each one of the nodes 110a-110b may utilize one or more coherence links for inter-node access of processor on-die caches and off-die memory of another one of the nodes 110a-110b. In the embodiment shown, the nodes 110a-110b use coherence links 150-156. As used herein, coherence links may also be referred to as simply links. Although four links are shown in FIG. 1, other embodiments may comprise a different number of links. The interconnect technology used in links 150-156 may replace front-side bus communication.

In various embodiments, the links 150-156 include packet-based, bidirectional serial/parallel high-bandwidth, low-latency point-to-point communication. In addition, the interconnect technology uses a cache coherency extension. Examples of the technology include HyperTransport and QuickPath. Other proprietary coherence link technologies may also be selected for use on links 150-156. In other embodiments, the links 150-156 may be unidirectional, but still support a cache coherency extension. In addition, in other embodiments, the links 150-156 may not be packet-based, but use other forms of data transfer.

The hardware 102, which includes the nodes 110a-110b, may be connected to software 170. The software 170 may include a hypervisor 172. The hypervisor 172 is used to support a virtualized computing system. The benefits of chip multi-threading (CMT) include allowing several software applications to share a multi-core processor or even a multi-threaded core. A general-purpose operating system (OS) has control of a system's physical resources, such as allocation of the physical resources and management of external storage. Virtual memory and I/O device abstraction support the illusion that each software application controls all physical resources, or even more resources than are physically available.

Virtualization broadly describes the separation of a service request from the underlying physical delivery of that service. A software layer, or virtualization layer, may be added between the hardware and the OS. A software layer may run directly on the hardware without the need of a host OS. This type of software layer is referred to as a hypervisor. Although a hypervisor is a software layer, to be effective this layer may need hardware assistance. The trap handler 173 may include multiple trap subroutines or handlers that execute based on received traps. The subroutines may include one or more threads. The hypervisor 172 may allow for time-sharing a single computer between several single-tasking OSes.

In some embodiments, the software 170 may include a system logic domain manager 174 for controlling the operating states of the processors and other components within the computing system 100. The manager 174 may communicate with a power management unit 178 that includes policies and algorithms for changing operating states for different operating points. The power management unit 178 may send notifications to disable portions of the computing system 100 when it detects or is otherwise informed that the portion is unused for a given period of time. Similarly, power-performance states (P-states) may be adjusted based on compute unit usage feedback.

The node link status controller 175 may send control signals to the nodes 110a-110b for performing training of the links 150-156 during system startup and initialization. An electrical section of the physical layer within each of the links 150-156 manages the transmission of digital data in the one or more lanes within a single link. The electrical section drives the appropriate voltage signal levels with the proper timing relative to a clock signal. Additionally, it recovers the data at the other end of the link and converts it back into digital data. The logical section of the physical layer interfaces with the link layer and manages the flow of information back and forth between them. With the aid of the controller 175, it also handles initialization and training of the link.

Each of the nodes 110a-110b may monitor the bandwidth utilization across the links 150-156. For example, counters may be used within each of the nodes 110a-110b for each of the links 150-156. In various embodiments, monitoring logic within the nodes 110a-110b may count a number of clock cycles a given one of the links 150-156 is used to transfer data within a given time duration. A given direction of a link includes one or more lanes of data transfer in a particular direction, such as from node 110a to node 110b. A bidirectional link includes two directions, each comprising one or more lanes for data transfer. For bidirectional links, a separate count may be maintained for incoming and outgoing data on a given link. In some embodiments, each node monitors a same direction for each of its bidirectional links. For example, a given node may monitor an outgoing direction for each connected bidirectional link. In other embodiments, a given node may monitor both incoming and outgoing directions of connected bidirectional links. Accordingly, another node connected to the given node may not monitor any directions of the bidirectional links, since the given node has all information regarding utilization of each direction of the bidirectional links between them. In some embodiments, the monitoring logic may compare the count to one or more threshold values at the end of a time period. In other embodiments, the monitoring logic may compare the count to one or more threshold values each time the count is updated. If the monitoring logic determines the count is less than a low threshold, then the given link may be considered to be underutilized. Alternatively, if the monitoring logic determines the count is greater than a high threshold, then the given link may be considered to be over utilized.

An interval counter may be used to define a time period or duration. In some embodiments, an interval counter is paired with an activity counter. The activity counter may count a number of clock cycles a respective link sends data. The interval counter may increment until it reaches a given value, and then resets. When the interval counter reaches the given value, the count value within the activity counter may be compared to the high and low threshold values. Alternatively, the count value may be saved and then compared. Afterward, the activity counter may also be reset and begin counting again. The time duration and threshold values may be stored in a configuration file within the data 176. These values may be programmable.

If a given link of the links 150-156 in a given set is found to be underutilized, the monitoring logic within the nodes 110a-110b may generate a trap. The terms "set" and "set of links" are used as described earlier. The trap may indicate the given link in the given set is underutilized. In one embodiment, the traps are potentially generated at the end of the timing interval set by the interval counter. The trap handler 173 within the hypervisor 172 may handle the trap. Control logic within the trap handler 173 may determine whether any link of the links 150-156 in the given set is over utilized. If this condition is satisfied, then no link may be turned off. However, if no other link in the given set is over utilized while the given link is underutilized, then any link in the set may be turned off. Additional conditions may be used to determine when to turn off the link. For example, to avoid frequent oscillation between turning on and off a same link, other conditions based on past behavior may be used to qualify enabling and disabling the link.

The hypervisor 172 receives the generated trap and a respective subroutine within the trap handler 173 may be selected. In one embodiment, the selected subroutine accesses control and status registers within the link interfaces of the nodes 110a-110b. The subroutine may write one or more values stored in these registers to a given location within shared memory. Alternatively, the subroutine may perform computations on the stored values associated with the links

150-156 and write the results to the given shared memory location. In one embodiment, the status and count values and/or computation results are written to the shared memory location when a trap associated with the links 150-156 is generated. If the subroutine determines each of the other enabled links within links 150-156 does not have a status of being over utilized, then steps may be taken to turn off a link. Turning off the link may reduce power consumption within the computing system 100. Further details are provided below.

Figure 2:
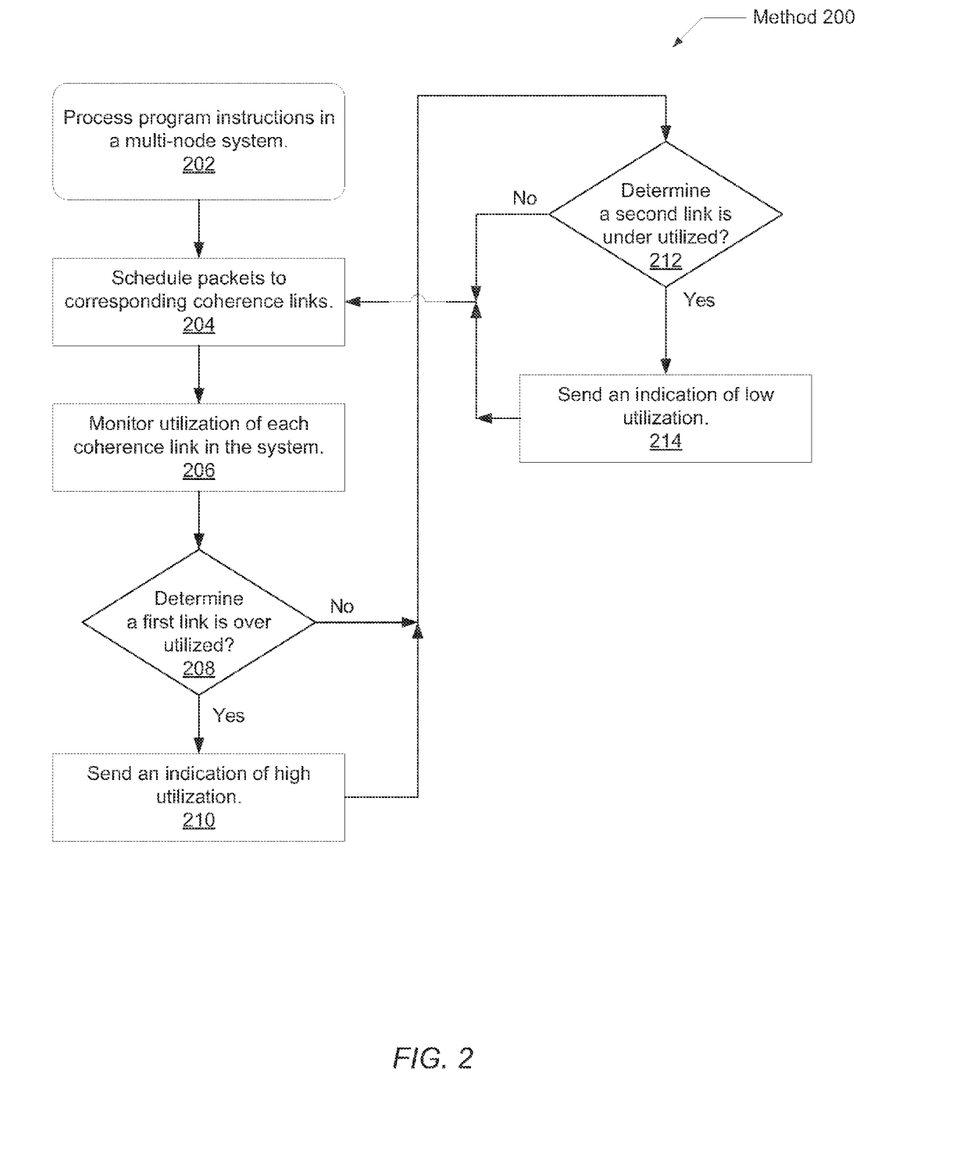
FIG. 2 is a generalized flow diagram illustrating one embodiment of a method for monitoring bandwidth utilization on coherence links in a multi-node system.

Referring now to FIG. 2, a generalized flow diagram of one embodiment of a method 200 for monitoring bandwidth utilization on coherence links in a multi-node system is illustrated. The components embodied in the computing system described above may generally operate in accordance with method 200. For purposes of discussion, the steps in this embodiment are shown in sequential order. However, some steps may occur in a different order than shown, some steps may be performed concurrently, some steps may be combined with other steps, and some steps may be absent in another embodiment.

In block 202, program instructions are processed in a multi-node system. A processor and its respective off-die memory may be referred to as a node. A processor within a given node may have access to a most recently updated copy of data in the on-die caches and off-die memory of other nodes through one or more coherence links. Placement of the processors within the nodes may use socket, surface mount, or other technology. The program instructions may correspond to one or more software applications. During processing, each node within the system may access data located in on-die caches and off-die memory of other nodes in the system. Coherence links may be used for the data transfer. In some embodiments, the coherence links are packet-based. In block 204, each node may schedule packets to coherence links based at least on packet type. If multiple links within a node may be used, a round robin or other arbitration algorithm may be used to assign packets to links.

In block 206, each node may monitor bandwidth utilization of each associated coherence link. For example, a coherence unit within an interface to another node may include logic for monitoring. In some embodiments, counters and comparators may be used as described earlier. In some embodiments, each node monitors a same direction for each of its links. For example, each node may monitor an outgoing data transfer direction for each connected link. In other embodiments, a given node may monitor both incoming and outgoing data transfer directions of connected links. Accordingly, another node connected to the given node may not monitor any directions of links, since the given node has all information regarding utilization of each direction of links between them. In various embodiments, a check for high utilization has higher priority than a check for low utilization, although the monitoring is used for reducing power consumption. This priority scheme prevents turning off a link in a given set when other links in the given set still have high bandwidth utilization. Turning off a link under these conditions may further congest the already congested links.

If monitoring logic within a node for a given set determines a first link in the given set is over utilized (conditional block 208) then in block 210, an indication of high utilization may be sent. In one embodiment, the node that measured the high utilization generates a trap. The generated trap may be sent to the hypervisor for trap handling. The trap handling steps may turn on one of the disabled links in order to alleviate the high utilization of the first link. Further details are provided shortly.

If monitoring logic within a node for a given set determines a second link in the given set is underutilized (conditional block 212), then in block 214, an indication of low utilization may be sent. Similar to the indication of high utilization, the node that measured the low utilization generates a trap. The generated trap may be sent to the hypervisor for trap handling. The trap handling steps may turn off a link in order to reduce power consumption. Further details are provided shortly. In other embodiments, more qualifying conditions may be satisfied prior to generating traps based on high and low utilization of links. More hardware control logic may be added to the monitoring logic within the nodes to check these conditions. Alternatively, software may be used to check additional conditions as further described below.

Figure 3:
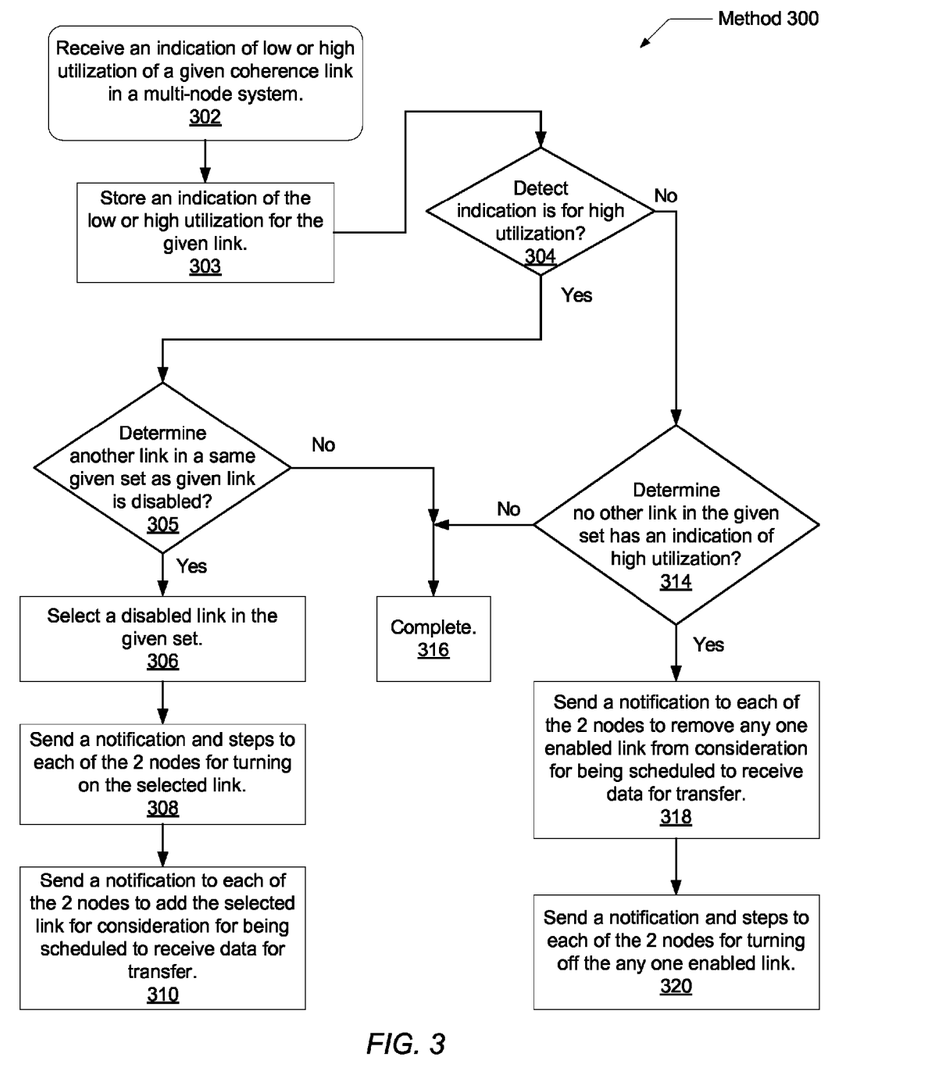
FIG. 3 is a generalized flow diagram illustrating one embodiment of a method for turning on and off links based on at least link bandwidth utilization.

Referring now to FIG. 3, a generalized flow diagram of one embodiment of a method 300 for turning on and off links based on at least link bandwidth utilization is illustrated. The components embodied in the computing system described above may generally operate in accordance with method 300. For purposes of discussion, the steps in this embodiment are shown in sequential order. However, some steps may occur in a different order than shown, some steps may be performed concurrently, some steps may be combined with other steps, and some steps may be absent in another embodiment.

In block 302, an indication of low or high utilization of a given coherence link in a given set in a multi-node system is received. In various embodiments, a hypervisor receives the indication as a generated trap from a node in the system. A corresponding trap handler may be selected and executed. In block 303, an indication of low or high utilization for the given link is stored. In some embodiments, the indication is stored in a given memory location in shared memory. If the indication is for high utilization (conditional block 304) and another link in a same given set as the given link is disabled (conditional block 305), then in block 306, a disabled link in the given set is selected. In some embodiments, it may be known that at least one link is disabled between the same 2 nodes, since this condition may be included as one of the qualifying conditions for the high utilization trap. Additional hardware logic may be added to the monitoring logic within the link interfaces of nodes to check more conditions prior to generating traps.

It is noted that either hardware or software may check for other conditions to be satisfied when determining whether to enable and disable links. For example, a given link may be used for a given packet type. The given link may be turned off. Later, a respective queue for incoming packets may fill as an application that uses the given packet type begins execution. The given link may be the only link between the same 2 nodes as the given link capable of handling the given packet type. Therefore, the given link may be turned on despite its bandwidth utilization being low, or zero.

In block 308, the corresponding trap handler sends a notification and steps to each of the 2 nodes for turning on the selected link that is currently disabled. In block 310, the corresponding trap handler sends a notification to each of the 2 nodes to add the selected link to being considered for being scheduled to receive data for transfer. The scheduling logic may include routing tables and combinatorial logic following steps of a chosen algorithm for scheduling data to links. In some embodiments, a separate notification is not sent from the trap handler, since the hardware control logic within the node may perform the addition of the turned-on link to being considered for being scheduled to receive data for transfer at the completion of startup training. In other embodiments, an indication of completion of the startup training may be sent from the node link status controller 175, rather than the trap handler, to a corresponding one of the nodes.

If the indication sent from a node to the hypervisor is not for high utilization (conditional block 304), then the indication is for low utilization. If another link in the given set has a corresponding stored indication of high utilization (conditional block 314), then the processing of the trap may complete in block 316. No links in the given set may be turned off at this time. In other embodiments, the trap handler may investigate whether the other links in the given set have an indication of low utilization, rather than have an indication of high utilization. If this condition is satisfied, then a link may be turned off.

If no other link in the given set has an indication of high utilization (conditional block 314), then in block 318, a notification may be sent from the trap handler to each of the 2 nodes to remove any one enabled link from consideration for being scheduled to receive data for transfer. In block 320, a notification and steps for turning off the any one enabled link may be sent from the trap handler to each of the 2 nodes. Alternatively, the steps for tuning off the any one enabled link may be sent from the node link status controller 175, rather than the trap handler, to each of the 2 nodes. In some embodiments, the hardware control logic within a node does not begin the received steps until each outstanding transaction still stored for the any one enabled link has completed. In other embodiments, the trap handler or the node link status controller 175 does not send the steps until notification is received from a node that each outstanding transaction still stored for the any one enabled link has completed.

Figure 4:
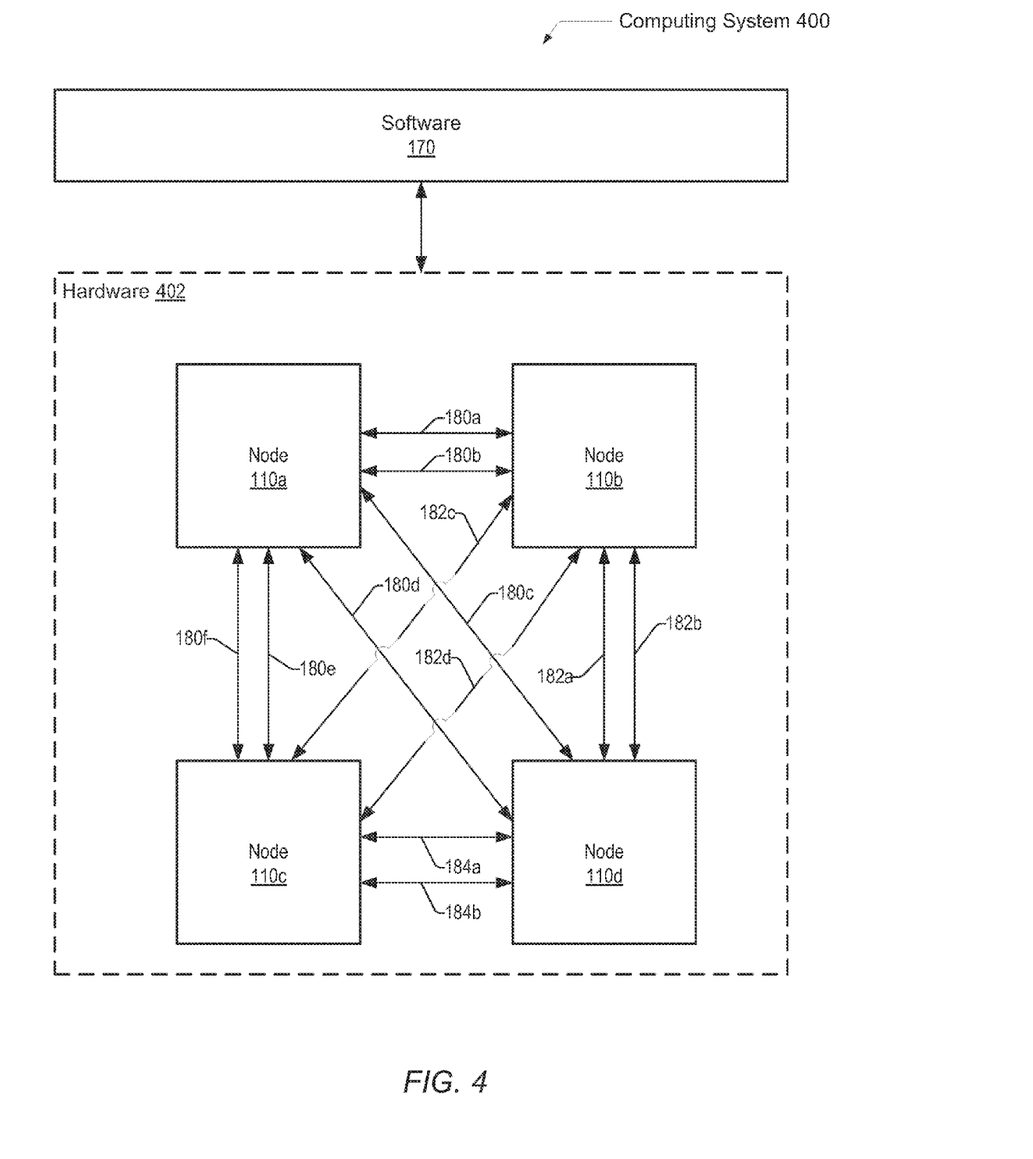
FIG. 4 is a generalized block diagram illustrating another embodiment of a computing system.

Turning now to FIG. 4, a generalized block diagram of another embodiment of a computing system 400 is shown. Circuit components described earlier are numbered identically. Computing system 400 includes software 170 and hardware 402. The hardware 402 includes nodes 110a-110d. Although four nodes are shown in FIG. 4, other embodiments may include a different number of nodes. In some embodiments, the nodes 110a-110d are located on a single printed circuit board. In other embodiments, each one of the nodes 110a-110d is located on a respective single printed circuit board. In yet other embodiments, two of the four nodes 110a-110d are located on a first printed circuit board and the other two nodes are located on a second printed circuit board. Multiple printed circuit boards may be connected for communication by a back plane.

Systems with chip multi-threading (CMT) use an appreciable amount of memory bandwidth. The dedicated cache coherence links in a multi-socket system provide near-linear scaling of performance with thread count. The dedicated cache coherence links 180a-180f, 182a-182d, and 184a-184b provide communication separate from other communication channels such as a front side bus protocol, a chipset component protocol, and so forth. As shown, the multi-node computing system 400 is expanded in a "glueless" configuration that does not use an application specific integrated circuit (IC) hub or a full custom IC hub for routing. Alternatively, the multi-node computing system 400 may be expanded with the use of a hub, especially when the number of sockets reaches an appreciable value and development costs account for the extra hardware and logic.

"As shown, each one of the nodes 110a-110d may utilize one or more coherence links for inter-node access of processor on-die caches and off-die memory of another one of the nodes 110a-110d. In the embodiment shown, the nodes 110a-110d use coherence links 180a-180f, 182a-182d, and 184a-184b. Although two links are used between any two nodes in FIG. 4, other embodiments may comprise a different number of links between any two nodes. In addition, although the links 180a-180f, 182a-182d, and 184a-184b are shown as bidirectional links, in other embodiments, one or more links may be unidirectional. The links 180a-180f, 182a-182d, and 184a-184b may be packet-based. Alternatively, the links 180a-180f, 182a-182d, and 184a-184b may use other data transfer mechanisms."

The hardware in the nodes 110a-110d may be connected to software 170. The steps described earlier regarding turning on and off links based on bandwidth utilization may be used in the computing system 400. In various embodiments, the control logic within the hardware and software may not allow a link to be turned off if the link is the last enabled link in a respective set of links. In other embodiments, the control logic may allow the last enabled link in the respective set of links to be turned off. However, a performance penalty may be associated with this embodiment, since initial packets to be transferred between the two nodes now wait for startup training to complete prior to actually being transferred.

Figure 5:
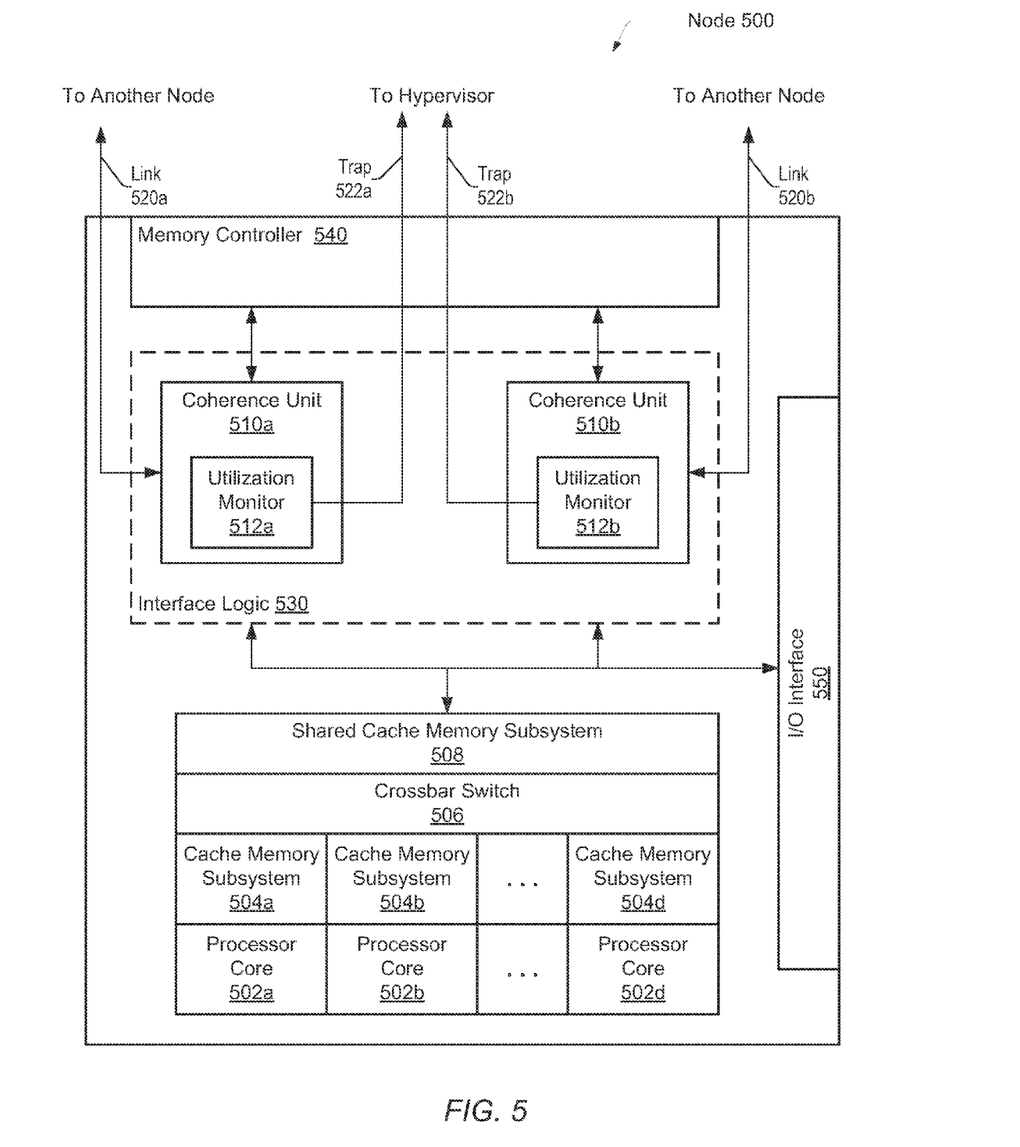
FIG. 5 is a generalized block diagram of one embodiment of an exemplary processing node.

Referring now to FIG. 5, a generalized block diagram of one embodiment of an exemplary node 500 is shown. Node 500 may include memory controller 540, input/output (I/O) interface logic 550, interface logic 530, and one or more processor cores 502a-502d and corresponding cache memory subsystems 504a-504d. In addition, node 500 may include a crossbar switch 506 and a shared cache memory subsystem 508. In one embodiment, the illustrated functionality of processing node 500 is incorporated upon a single integrated circuit.

In one embodiment, each of the processor cores 502a-502d includes circuitry for executing instructions according to a given general-purpose instruction set. For example, the SPARC® instruction set architecture (ISA) may be selected. Alternatively, the x86, x86-64®, Alpha®, PowerPC®, MIPS®, PA-RISC®, or any other instruction set architecture may be selected.

Each of the processor cores 502a-502d may include a superscalar microarchitecture with one or more multi-stage pipelines. Also, each core may be designed to execute multiple threads. A multi-thread software application may have each of its software threads scheduled to be executed on a separate pipeline within a core, or alternatively, a pipeline may process multiple threads via control at certain function units.

Generally, each of the processor cores 502a-502d accesses an on-die level-one (L1) cache within a cache memory subsystem for data and instructions. There may be multiple on-die levels (L2, L3 and so forth) of caches. In some embodiments, the processor cores 502a-502d share a cache memory subsystem 508. If a requested block is not found in the caches, then a read request for the missing block may be generated and transmitted to the memory controller 540. Interfaces between the different levels of caches may comprise any suitable technology.

The interface logic 530 may generate control and response packets in response to transactions sourced from processor cores and cache memory subsystems located both within the processing node 500 and in other nodes. The interface logic 530 may include logic to receive packets and synchronize the packets to an internal clock. The interface logic may include coherence units 510a-510b. Although two coherence units are shown in FIG. 5, other embodiments may include a different number of coherence units. The coherence units 510a-510b may perform cache coherency actions for packets accessing memory according to a given protocol. The coherence units 510a-510b may include a directory for a directory-based coherency protocol. Additionally, the coherence units 510a-510b may include utilization monitors 512a-512b. These monitors may track the bandwidth use on the links 520a-520b. In some embodiments, counters and comparators may be used as described earlier.

In various embodiments, the coherence units 510a-510b are located outside of the memory controller 540 as shown. In other embodiments, the logic and functionality within the interface logic 530 may be incorporated in the memory controller 540. When low or high utilization is detected and other qualifying conditions are satisfied, the monitors 512a-512b may generate traps 522a-522b and send the traps to a hypervisor. The hypervisor may select an associated handler or subroutine to determine whether to turn on or off particular links based on at least information associated with the received traps. The subroutine may send appropriate steps to the associated nodes for enabling and disabling links.

In some embodiments, the interface logic 530 may determine under and over utilization of links in a given set by an amount or an input rate of incoming data traffic from the processor cores and corresponding caches. The interface logic 530 may monitor this incoming traffic and make determinations for generating traps based on the incoming traffic. Alternatively, the interface logic may monitor queues for the links 520a-520b and determine under and over utilization of links in a given set by an amount the queues are filled. The generation of traps may be based on the percentage of the queue capacities that are filled.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
control logic;
a plurality of nodes including at least a first node and a second node, wherein each of said nodes includes a processor and a cache; and
a set of links coupling the first node to the second node, the set of links including at least a first link and a second link;
wherein in response to a cache miss by a processor within a given node of the plurality of nodes, the given node is configured to convey a request for data corresponding to the cache miss to another node of the plurality of nodes via the set of links;
wherein each of a first node and a second node of the plurality of nodes is configured to:
detect a level of utilization for each of the first link and the second link;
send an indication of low utilization for the first link in the set of links to the control logic, in response to determining the first link is underutilized; and
send an indication of high utilization for the first link in the set of links to the control logic, in response to determining the first link is overutilized;
wherein the control logic is configured to:
send a notification to each of the first node and the second node for turning off the second link, in response to determining both the first link and the second link are currently enabled for communicating between the first node and the second node, and the first link is underutilized; and
send a notification for enabling the second link, in response to determining the first link is overutilized and the second link is currently disabled, thereby enabling both the first link and the second link for concurrent communication between the first node and the second node.

2. The computing system as recited in claim 1, wherein in response to receiving said notification for turning off the second link, each of the first node and the second node is further configured to:
remove the second link from consideration for being scheduled to receive packets;
wait for one or more outstanding transactions on the second link to complete; and
turn off the second link, in response to the outstanding transactions have completed.

3. The computing system as recited in claim 2, wherein sending the notification to turn off the second link is in further response to determining no other link in the set of links is over utilized.

4. The computing system as recited in claim 2, wherein determining the first link is underutilized comprises:
counting a number of clock cycles the first link is used to transfer data within a given time duration;
determining the number is less than a low threshold.

5. The computing system as recited in claim 4, wherein each of the low threshold and the time duration is programmable.

6. The computing system as recited in claim 1, wherein when both the first link and the second link are concurrently enabled, an arbitration algorithm is used to assign packets to each of the links for communication.

7. The computing system as recited in claim 1, wherein in response to enabling the second link, each of the first node and the second node is further configured to:
add the second link for consideration for being scheduled to receive data for transfer, in response to determining the second link has completed startup training.

8. The computing system as recited in claim 1, wherein sending the notification for enabling the second link is in further response to determining the second link is capable of handling packets of a type that are causing the overutilization of the first link.

9. A method to be used in a computing system comprising control logic, a plurality of nodes including at least a first node and a second node, and a set of links including at least a first link and a second link coupling the first node to the second node, the method comprising:
in response to a cache miss by a processor within a given node of the plurality of nodes, conveying a request for data corresponding to the cache miss to another node of the plurality of nodes via the set of links;
detecting a level of utilization for each of the first link and the second link;
sending to the control logic an indication of low utilization for the first link in the set of links between the first node and the second node, in response to determining the first link is underutilized;
sending an indication of high utilization for the first link in the set of links to the control logic, in response to determining the first link is overutilized; and sending a notification to each of the first node and the second node for turning off the second link, in response to determining both the first link and the second link are currently enabled for communicating between the first node and the second node, and the first link is underutilized;

sending a notification for enabling the second link, in response to determining the first link is overutilized and the second link is currently disabled, thereby enabling both the first link and the second link for concurrent communication between the first node and the second node.

10. The method as recited in claim 9, wherein in response to receiving said notification for turning off the second link, the method further comprises:

removing the second link from consideration for being scheduled to receive packets;

waiting for one or more outstanding transactions on the second link to complete; and turning off the second link, in response to the outstanding transactions have completed.

11. The method as recited in claim 10, wherein sending the notification to turn off the second link is in further response to determining no other link in the set of links is over utilized.

12. The method as recited in claim 10, wherein when both the first link and the second link are concurrently enabled, an arbitration algorithm is used to assign packets to each of the links for communication.

13. The method as recited in claim 10, further comprising sending from the control logic to each of the first node and the second node a notification for turning on any one disabled link in the set of links, in response to determining a second set of qualifying conditions is satisfied.

14. The method as recited in claim 13, wherein in response to enabling the second link, the method further comprises:

adding the second link for consideration for being scheduled to receive data for transfer, in response to determining the second link has completed startup training.

15. The method as recited in claim 13, wherein sending the notification for enabling the second link is in further response to determining the link is capable of handling packets of a type that are causing the overutilization of the first link.

16. A non-transitory computer readable storage medium storing program instructions operable to reduce power consumption during data transport across multiple nodes in a system comprising control logic, a plurality of nodes including at least a first node and a second node, and a set of links including at least a first link and a second link coupling the first node to the second node, wherein the program instructions are executable by a processor to:

wherein in response to a cache miss by a processor within a given node of the plurality of nodes, the given node is configured to convey a request for data corresponding to the cache miss to another node of the plurality of nodes via the set of links detect a level of utilization for each of the first link and the second link;

send to the control logic an indication of low utilization for the first link in the set of links between the first node and the second node, in response to determining the first link is underutilized;

send an indication of high utilization for the first link in the set of links to the control logic, in response to determining the first link is overutilized; and send a notification to each of the first node and the second node for turning off the second link, in response to determining both the first link and the second link are currently enabled for communicating between the first node and the second node, and the first link is underutilized; and send a notification for enabling the second link, in response to determining the first link is overutilized and the second link is currently disabled, thereby enabling both the first link and the second link for concurrent communication between the first node and the second node.

17. The storage medium as recited in claim 16, wherein in response to receiving said notification for turning off the second link, the program instructions are further executable to:

remove the second link from consideration for being scheduled to receive packets;

wait for one or more outstanding transactions on the second link to complete; and turn off the second link, in response to the outstanding transactions have completed.

18. The storage medium as recited in claim 17, wherein sending the notification to turn off the second link is in further response to determining no other link in the set of links is over utilized.

19. The storage medium as recited in claim 17, wherein when both the first link and the second link are concurrently enabled, an arbitration algorithm is used to assign packets to each of the links for communication.

* * * * *